(12) United States Patent
Kye (10) Patent No.: US 7,327,726 B2
(45) Date of Patent: Feb. 5, 2008

(54) MEDIA ACCESS CONTROL FRAME STRUCTURE AND DATA COMMUNICATION METHOD IN CABLE NETWORK

(75) Inventor: Hwan Won Kye, Seoul (KR)

(73) Assignee: LG Electronics Inc., Seoul (KR)

( * ) Notice: Subject to any disclaimer, the term of this patent is extended or adjusted under 35 U.S.C. 154(b) by 1139 days.

(21) Appl. No.: 10/003,068

(22) Filed: Dec. 6, 2001

(65) Prior Publication Data

US 2002/0067721 A1 Jun. 6, 2002

(30) Foreign Application Priority Data

Dec. 6, 2000 (KR) ................................ 2000-73664

(51) Int. Cl.
*H04L 12/28* (2006.01)
*H04J 3/24* (2006.01)
*G06F 15/16* (2006.01)

(52) U.S. Cl. .................... 370/389; 370/474; 709/230

(58) Field of Classification Search ................ 370/353, 370/389, 465, 474; 375/222; 709/227, 228, 709/230
See application file for complete search history.

(56) References Cited

U.S. PATENT DOCUMENTS

| | | | |
|---|---|---|---|
| 6,438,123 B1 * | 8/2002 | Chapman ................. | 370/351 |
| 6,650,624 B1 * | 11/2003 | Quigley et al. ............. | 370/252 |
| 6,788,707 B1 * | 9/2004 | Horton et al. ............. | 370/474 |
| 6,901,049 B1 * | 5/2005 | Chapman .................. | 370/230 |
| 6,909,715 B1 * | 6/2005 | Denney et al. ............ | 370/392 |
| 2002/0049861 A1 * | 4/2002 | Bunn et al. ................ | 709/247 |
| 2002/0062380 A1 * | 5/2002 | Mohammed et al. ....... | 709/228 |
| 2002/0062394 A1 * | 5/2002 | Bunn et al. ................ | 709/246 |
| 2002/0073227 A1 * | 6/2002 | Bunn et al. ................ | 709/236 |
| 2002/0080868 A1 * | 6/2002 | Bunn et al. ................ | 375/222 |
| 2002/0106029 A1 * | 8/2002 | Bunn et al. ................ | 375/257 |

* cited by examiner

*Primary Examiner*—Wing Chan
*Assistant Examiner*—Hong Sol Cho
(74) *Attorney, Agent, or Firm*—Birch, Stewart, Kolasch & Birch, LLP (57) ABSTRACT

A media access control (MAC) frame structure in a cable network includes a MAC header having various extended header types. A data communication method includes transmitting a first EH_TYPE packet according to the change in the PHS rule to a receiver when the PHS rule changes, checking whether there exists an error in the first EH_TYPE packet, determining whether to apply a new PHS rule on the basis of the first EH_TYPE and transmitting a second EH_TYPE packet to a sender, terminating transmission of a common PHS packet, setting a packet type as a third EH_TYPE, suppressing a packet into a new channel, and transmitting the packet when the second EU—TYPE packet is a success message and setting the packet type as a common MAC packet and transmitting the packet without performing suppression when the second EH_TYPE packet is a failure message.

17 Claims, 6 Drawing Sheets

| EH_TYPE DESCRIPTION | EH_TYPE | EH_LEN | EH_VALUE |
|---|---|---|---|
| PAYLOAD HEADER SUPPRESSION RULE CHANGE(SENDER) | 7 | 1 | PHSI(1 BYTE) |
| PAYLOAD HEADER SUPPRESSION RULE CHANGE(RECEIVER) | 8 | 1 | PHSI(1 BYTE) |

MEDIA ACCESS CONTROL FRAME STRUCTURE AND DATA COMMUNICATION METHOD IN CABLE NETWORK

BACKGROUND OF THE INVENTION

1. Field of the Invention

The present invention relates to a cable network, and more particularly, to a media access control (MAC) frame structure and a data communication method for reducing various signaling processes required in case that a cable modem (CM) wishes to change a header format of a suppressed packet.

2. Description of the Background Art

A cable network, which is a form of media for providing various multimedia services such as an analog signal, a data signal, and audio and moving picture signals, has been spread all over the world.

The cable network is divided into a cable modem (CM) for helping a user transmit and receive a data and a cable modem terminal system (CMTS) connected to a wide area network for transmitting a data to a user and receiving a data from a user through a radio-wave repeater station.

The CM has great possibilities in a cable network field with the development of the Internet.

The multimedia cable network system partners (MCNS) that currently lead cable services all over the world established cable television laboratories referred to as "Cable Labs" and have executed a cable modem project referred to as data-over-cable service interface specifications (DOCSIS). The Annex B, which is one of the standards of the CM recommended by the international telecommunications union-telecommunication standardization sector (ITU-T) in 1998, adopts the DOCSIS 1.0 specification created by the MCNS that is a cable television enterpriser group of North America. The DOCSIS version 1.1 has currently been published.

In the North America standards that have currently been developed by the enterprises all over the world, the CM performs only a bridging function of transmitting an Internet protocol (IP). However, the CM acquires the IP and the configuration files thereof or has an upper communication protocol for operating as a simple network management protocol agent. The required standards of the CM have been defined through the configuration files in order to transmit data at very high speed on a cable television network.

The DOCSIS provides the following characteristic functions in order to guarantee quality of service (QoS) the same as the QoS of voice over IP (VoIP).

1. Dynamic service flow establishment
2. Upstream service flow scheduling service
3. Fragmentation
4. Payload header suppression (PHS)

Herein, the PHS means that, when a sender suppresses (conceals) the unnecessary parts that need not be repeatedly transmitted in a payload header of a media access control (MAC) frame and transmits the remaining parts, a receiver restores the concealed parts and transmits the restored parts to a third receiver. In communication in an upstream direction, the sender is the CM and the receiver is the CMTS. In communication in a downstream direction, the sender is the CMTS and the receiver is the CM. The position where the suppression is performed is the end of an extended header and comes after a header check sequence (HCS) field.

Figure 1:
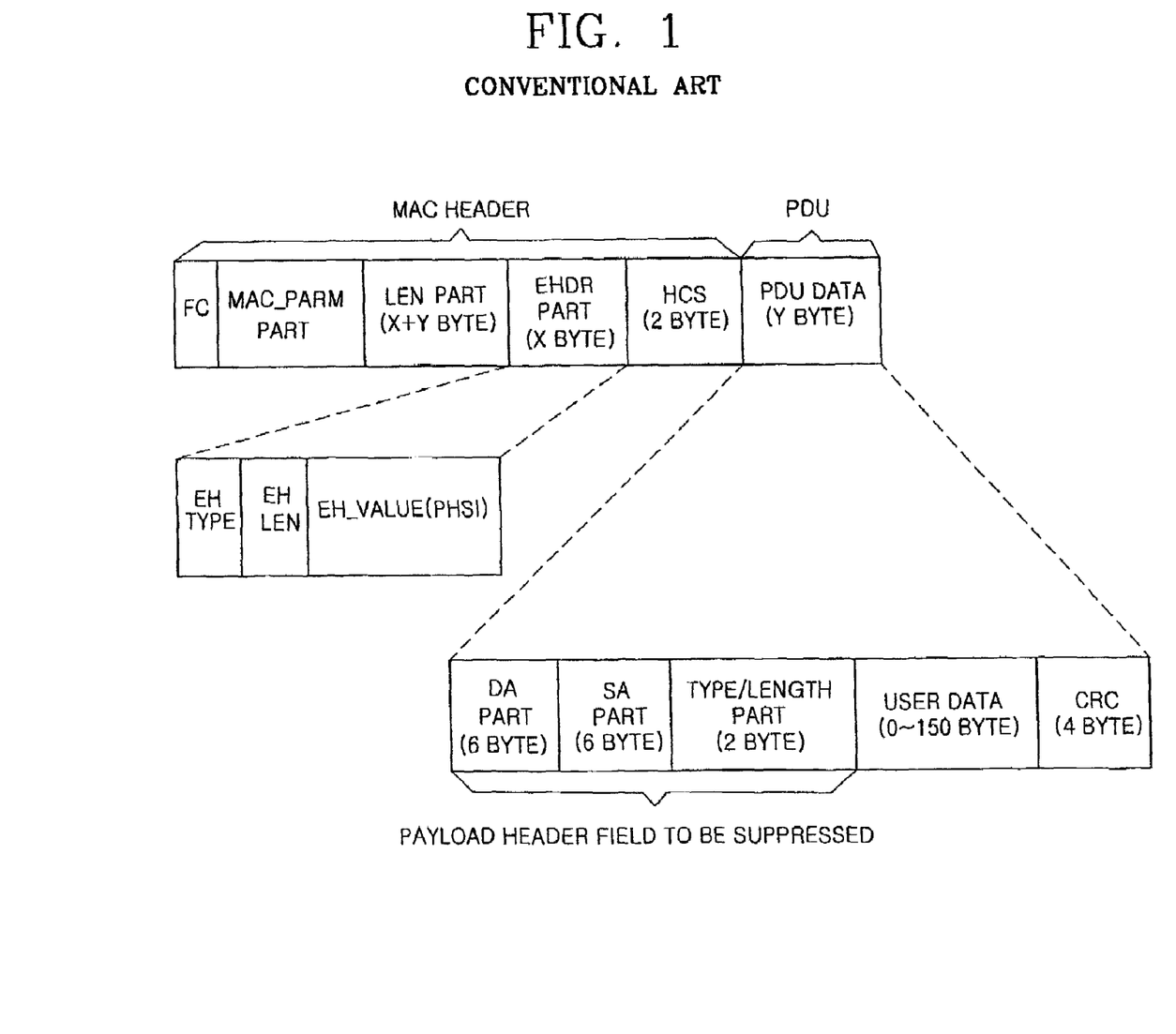
FIG. 1 shows a media access control (MAC) frame according to the conventional art.

The above contents will now be described in more detail. FIG. 1 shows a MAC frame according to a conventional art. As shown in FIG. 1, the suppression is performed in a payload data unit (PDU) data stream, which is the end of an extended header and is positioned after the HCS field in a transmitted data string, and is repeatedly applied to a specific field in the transmitted payload header of the PDU data of the MAC frame.

At this time, a payload header suppression index (PHSI) is included in the EH_VALUE of the extended header (EHDR). The PHSI is an index that denotes a payload header suppression field (PHSF). The PHSF is a string that denotes the header of the PDU suppressed more than 1 byte. The PHSI of 8 bits is unique in each service identifier (SID) in the upstream direction and in each CM in the downstream direction and is designated by the CMTS.

As shown in FIG. 1, a destination address (DA) means the address of the receiver, to which a packet is to be transmitted, in a suppressed payload header field. A source address (SA) means the address of the sender. User data means the actual data of a user to be transmitted to the receiver.

Packet transmission between the sender and the receiver will now be described in more detail.

First of all, the sender classifies a packet to be transmitted using a classifier and transmits the packet in an appropriate service flow. At this time, the classifier suppresses a specific payload header field of the packet using the PHSI mapped to the classifier and using the payload header suppression (PHS) rule of the PHSI.

During the suppression of the payload header, parameters according to the PHS rule that is defined in the sender and the receiver and is used by the sender and the receiver include the PHSF, the PHSI, a payload header suppression mask (PHSM), a payload header suppression size (PHSS), and payload header suppression verification (PHSV). Here, the PHSM is a bit mask for determining whether the PHSF is suppressed, that is, a parameter for determining which byte of the PHSF is to be suppressed and which byte of the PHSF is not to be suppressed. The PHSS is the length of the total suppressed bytes and has the value equal to the number of bytes of the PHSF to be transmitted. Also, the PHSV is a flag for comparing all of the bytes suppressed by a sender entity with an original header byte before transmitting all of the bytes suppressed by the sender entity, to thus show whether to examine all of the bytes suppressed by the sender.

The CM which is the sender in the upstream direction compares the original header byte for the suppression with the byte of the PHSF designated as a suppression region by the PHSM and performs the suppression when the original header byte coincides with the byte of the PHSF. The CM that is the sender inserts the PHSI into the EH_VALUE and transmits the packet according to the designated upstream service flow. The CMTS that is the receiver searches the PHSF, the PHSM, and the PHSS through the SID and the PHSI of the packet and restores an original packet using the byte included in the PHSF.

A rule for data transmission and reception between the sender and the receiver is necessary for the sender and the receiver to smoothly perform payload header suppression. The rule is the PHS rule. The PHS rule is generated through a registration message, a dynamic service addition (DSA) message, and a dynamic service change (DSC) message and is deleted through the DSC message and a dynamic service deletion (DSD) message. Here, when the PHS rule is generated, the CMTS defines the PHSI.

The DSA, the DSC, and the DSD are dynamic signaling standards for defining the contents of programming of channel characteristics, change in the channel characteristics, and deletion of the programmed channel characteristics and are provided by the DOCSIS version 1.1.

The PHS rule is partially or completely defined through the DSA message, the DSC message, and the DSD message when a service flow is generated.

Figure 2:
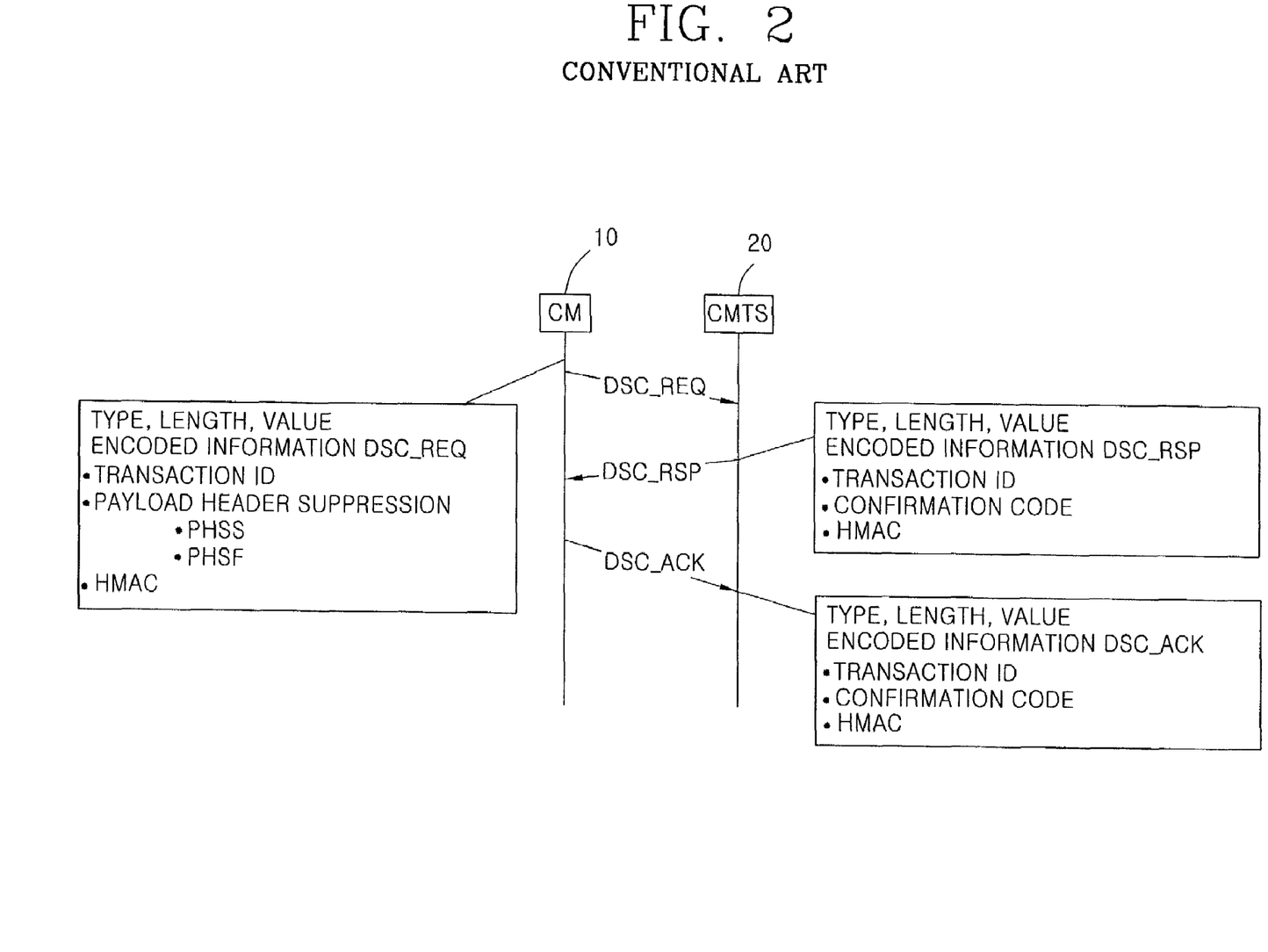
FIG. 2 describes a data communication method in a cable network according to the conventional art.

FIG. 2 is a block diagram describing a data communication method in the cable network according to the conventional art. The parameters according to the partially generated PHS rule are changed through 3 steps of exchanging DSC-REQ, DSC-RSP, and DSC-ACK messages between a CM 10 and a CMTS 20, which are DSC signaling processes.

In step 1, the CM 10 encodes the PHSS and the PHSF, loads the encoded PHSS and PHSF on the DSC-REQ message, and transmits the PHSS and the PHSF, which are loaded on the DSC-REQ message, to the CMTS 20 since the PHSS and the PHSF are not defined in the PHS rule.

In step 2, the CMTS 20 checks whether there exist errors in the transmitted parameters and transmits the DSC-RSP message showing whether the requested PHS rule can be supported to the CM 10.

In step 3, when the CM 10 transmits the received response of the DSCRSP to the CMTS 20 through the DSC-ACK message again, communication setting according to all of the DSC signaling processes is terminated.

In the step 1, during the initialization of the configuration file, the PHSF and the PHSS are not defined among the parameters of the PHS rule. The PHS rule is partially defined. In the step 2, when the parameter values of the channel are changed through the DSC signaling, the PHS rule previously registered or partially generated through the DSA is completely defined due to the changed parameters of the channel.

As mentioned above, according to the MAC frame structure and the data communication method in the cable network according to the conventional art, when a mode of the service flow generated through the registration process or DSA signaling is activated, in the case where complicated DSC signaling is used in order to simply change the PHS rule parameter, time is delayed and all of the bandwidths of the cable network are used for the DSC signaling. Accordingly, the efficiency of resources deteriorates.

SUMMARY OF THE INVENTION

Therefore, an object of the present invention is to provide a media access control (MAC) frame structure and a data communication method in a network, which is capable of improving the efficiency of resources by reducing waste of time spent on transmitting signal packets and unnecessary consumption of resources required for transmitting the signal packets when dynamic service change (DSC) signaling processes are used in order to initialize payload header suppression in the case where a payload header suppression (PHS) rule is partially generated.

To achieve these and other advantages and in accordance with the purpose of the present invention, as embodied and broadly described herein, there is provided a MAC frame structure in a cable network, comprising a MAC header comprising various extended header types according to a service flow between a sender and a receiver and a payload data unit (PDU) comprising parameters according to the PHS rule.

There is provided a data communication method in a cable network, comprising the steps of the sender transmitting a first EH_TYPE packet according to the change in the PHS rule to the receiver when the PHS rule changes, in the case where communication is performed between the sender and the receiver, checking whether there exists an error in the first EH_TYPE packet, determining whether to apply a new PHS rule on the basis of the first EH_TYPE, and transmitting a second EH_TYPE packet to the sender, terminating transmission of a common PHS packet, setting a packet type as a third EH_TYPE, suppressing a packet into a new channel, and transmitting the packet when the second EH_TYPE packet is a success message and setting the packet type as a common MAC packet and transmitting the packet without performing suppression when the second EH_TYPE packet is a failure message.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A media access control (MAC) structure in a cable network according to the present invention consists of a MAC header including various extended header types according to a service flow between a sender and a receiver and a payload data unit (PDU) including parameters according to a payload header suppression (PHS) rule.

The MAC header includes a frame controller (FC) for controlling a frame, a MAC_PARM that is a MAC parameter, the MAC_PARM for showing the number of required minislots or asynchronous transfer mode (ATM) cells, a LEN part for showing the length of the MAC frame, an EHDR part for showing the type, the length, the value, and the payload header suppression index (PHSI) of an extended header and changing the PHS rule using 3 extended types, and a header check sequence (HCS) for checking the MAC header.

The PDU includes a destination address (DA) part and a source address (SA) part having information of a suppressed payload header file, a type/length part for showing the type and the length of the suppressed payload header file, a user data unit having effective information data and the parameters according to the PHS rule, and a cyclic redundancy checking (CRC) for checking the error of MAC frame data.

A data communication method in the cable network according to the present invention includes the steps of the sender transmitting a first EH_TYPE packet according to change in the PHS rule to the receiver when the PHS rule changes, in the case where the transmission of a common MAC packet is performed between the sender and the receiver, checking whether there exists an error in the first EH_TYPE packet, determining whether to apply a new PHS rule, and transmitting a second EH_TYPE packet that is a success or failure message to the sender according to whether to support the PHS rule, when the second EH_TYPE packet is the success message, terminating the transmission of a common PHS packet, setting a packet type as a third EH_TYPE, suppressing the packet into a new channel, and transmitting the packet, and, when the second EH_TYPE packet is the failure message, setting the packet type as the common MAC packet and transmitting the packet without performing suppression.

The sender continuously transmits the first EH_TYPE packet to the receiver until the second EH_TYPE packet is received from the receiver. When there is no response to the first EH_TYPE packet from the receiver within a previously designated time, the sender determines that the packet transmission has failed.

When the transmission and the reception are in an upstream direction, the header type of the first EH_TYPE packet is set as 7, the header type of the second EH_TYPE is set as 8, and the header type of the third EH_TYPE packet is set as 6. When the transmission and the reception are in a downstream direction, the header type of the first EH_TYPE is set as 7, the header type of the second EH_TYPE is set as 8, and the header type of the third EH_TYPE is set as 5.

Preferred embodiments of the MAC frame structure and the data communication method in the cable network according to the present invention will now be described with reference to the attached drawings.

Figure 3:
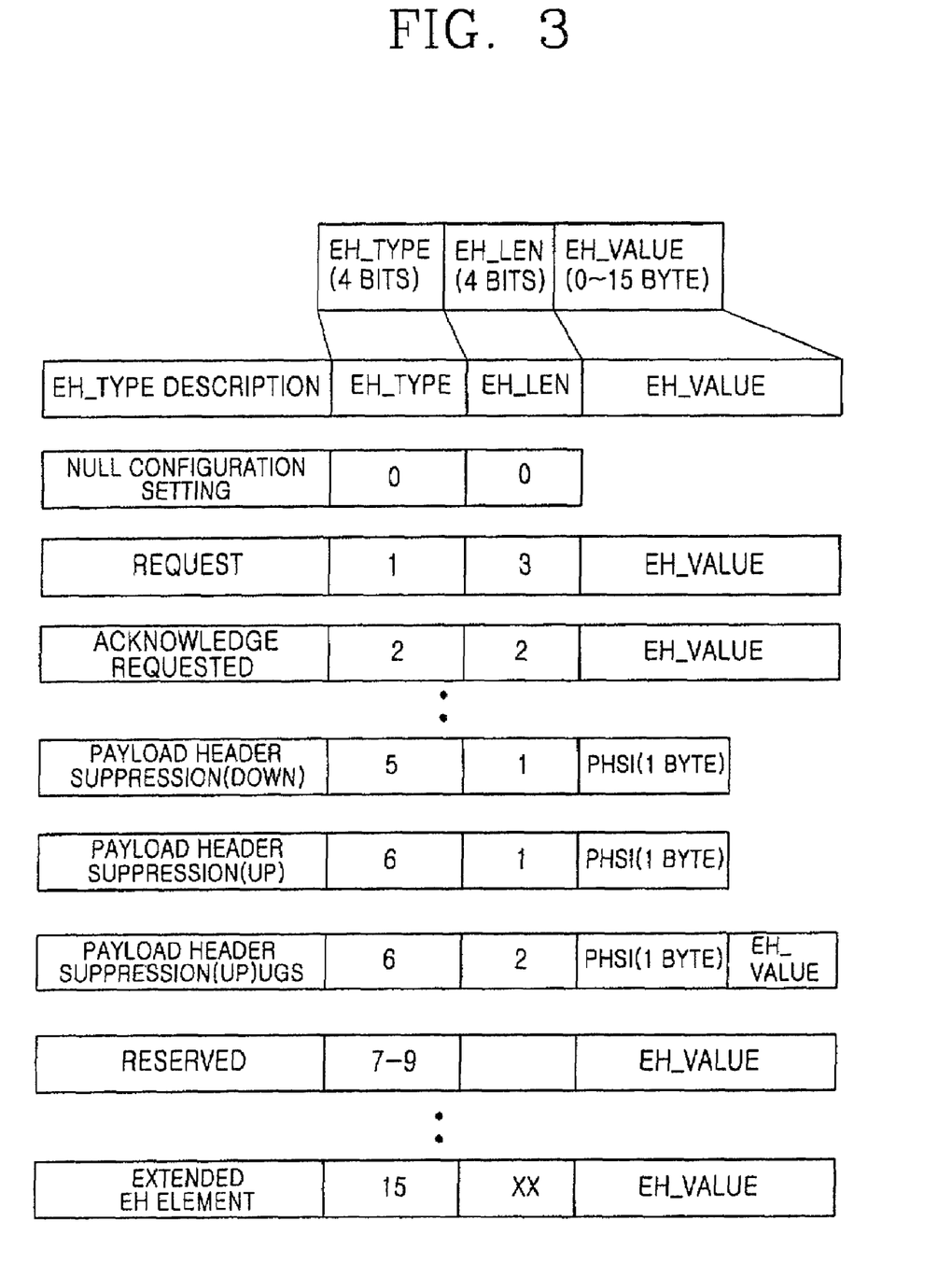
FIG. 3 shows a table displaying the type, the length, and the value of an extended header in the data-over-cable service interface specifications (DOCSIS) version 1.1.

FIG. 3 shows a table displaying an extended header type (EH_TYPE), an extended header length (EH_LEN), and an extended header value (EH_VALUE) in the current data-over-cable service interface specifications (DOCSIS) version1.1. As shown in FIG. 3, in the transmitted packets, on which payload header suppression is performed, the EH_TYPE of the MAC frame is set as 5 in the downstream direction and as 6 in the upstream direction.

Extended header types 7 through 9 are newly defined in the present invention in order to transmit the data packet, which will now be described in detail.

Figure 4:
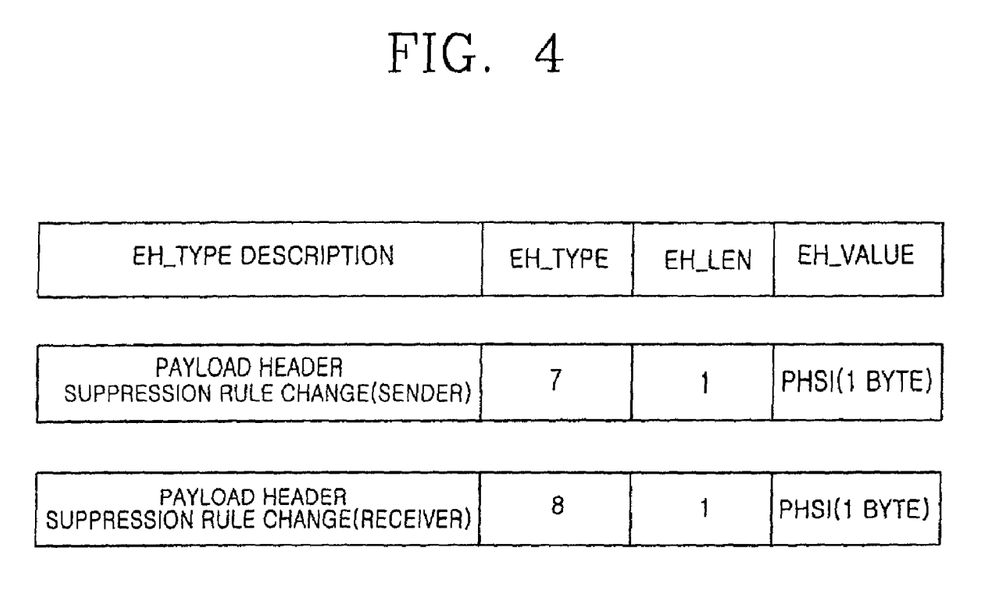
FIG. 4 shows an extended header type (EH_TYPE) for the converted payload header suppression (PHS) rule according to the present invention.

FIG. 4 shows extended header types for the change in the converted PHS rule according to the present invention in detail. Each of the 3 extended header types 7 through 9 is selected corresponding to the service flow in each direction. The extended header types are realized to have the function of changing the PHS rule like in dynamic service change (DSC) signaling processes. At this time, the extended header type (EH_TYPE) must be realized to have the same function as a DSC signal. In order to achieve this, the PDU in the MAC frame of the EH_TYPE must be encoded to parameter values according to the PHS rule like various quality of service (QoS) parameter values such as service flow parameters, classifier parameters, and the PHS rule, which are encoded according to a DSC message.

Figure 5:
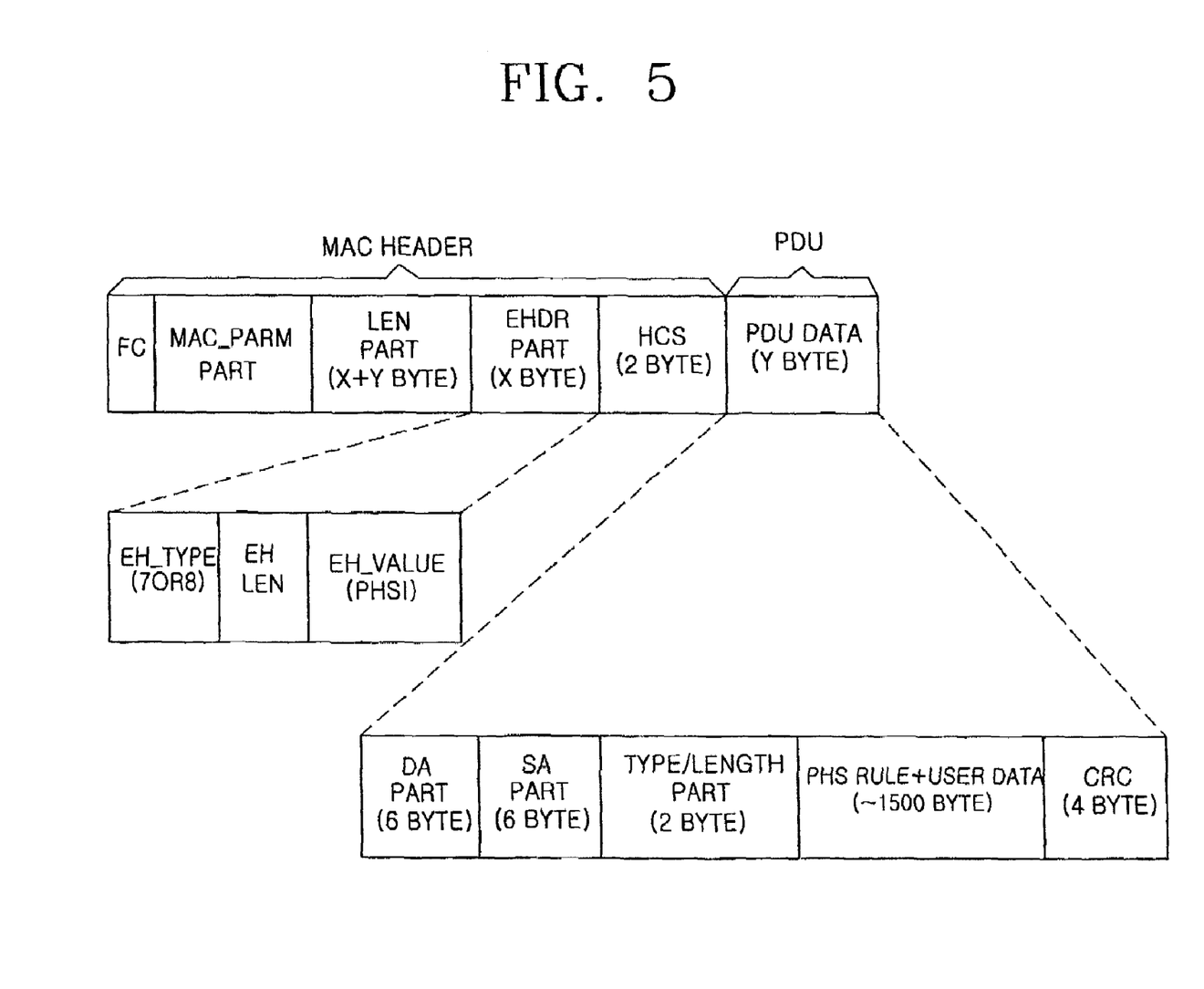
FIG. 5 shows a MAC frame including the PHS rule according to the present invention.

FIG. 5 shows the MAC frame including the PHS rule according to the present invention. As shown in FIG. 5, the MAC frame structure in the cable network according to the present invention includes the MAC header and the PDU.

The MAC header includes the FC of 1 byte for controlling the frame, the MAC_PARM part of 1 byte that is the MAC parameter, the MAC_PARM part for showing the number of required minislots or ATM cells, the LEN part for showing the length of the MAC frame, the EHDR part for showing the type, the length, the value, and the PHSI of the extended header and changing the PHS rule using the 3 extended types 7 through 9, and the HCS of 2 bytes for checking the MAC header. The PDU includes the DA part of 6 bytes for showing the address of the sender of the suppressed payload header file, the SA part of 6 bytes for showing the address of the receiver, to which the suppressed payload header filed is to be received, the type/length part of 2 bytes for showing the type and the length of the suppressed payload header file, the user data unit of 1 through 1500 bytes having the effective information data and the parameters according to the PHS rule, and the CRC unit of 4 bytes that is a MAC data check sequence.

In the above structure, when the PHS rule is partially generated, the PHS rule is completely defined using the DSC signaling processes in the conventional art. However, according to the present invention, the PHS rule parameters are inserted into the PDU, to thus initialize the payload header suppression through the extended header types. At this time, a payload header suppression size (PHSS), a payload header suppression field (PHSF), a payload header suppression mask (PHSM), and payload header suppression verification (PHSV) must be inserted into the transmitted MAC frame.

However, as mentioned above, since the PHS rule is partially generated, there exist previously defined parameters and parameters that are not defined among the above parameters. Therefore, only the parameters according to the PHS rule, which are not defined, are inserted into the PDU. Accordingly, the payload header suppression is initialized using the defined parameters and the inserted parameters.

The data communication method in the cable network according to the present invention will now be described in detail with reference to FIG. 6.

Figure 6:
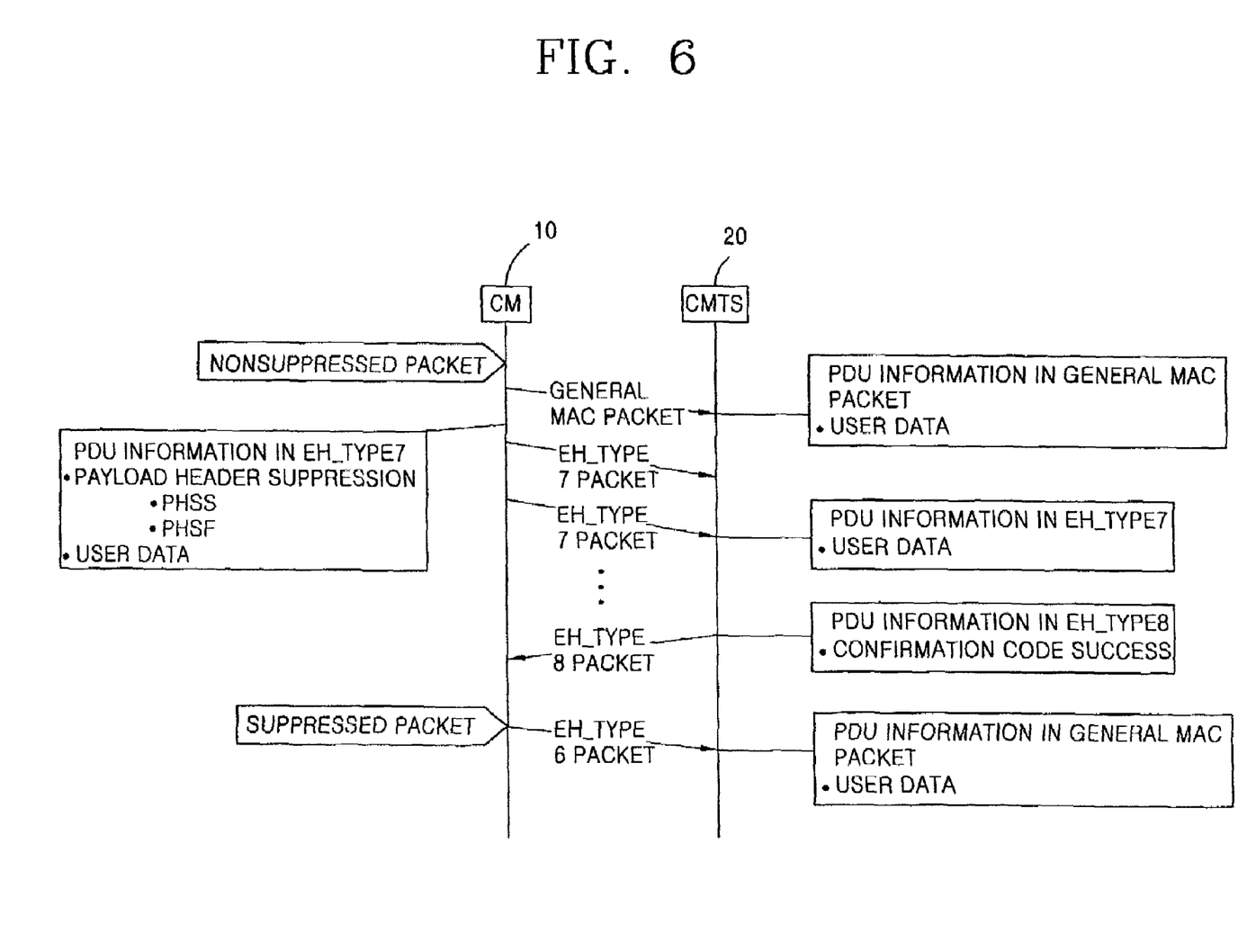
FIG. 6 shows PHS signaling processes through the extended header type (EH_TYPE) according to the present invention.

FIG. 6 shows an embodiment of PHS signaling processes through the extended header type (EH_TYPE) according to the present invention. As shown in FIG. 6, in the case where the PHS rule is to be changed according to change in a channel while the common MAC packet is transmitted from a cable modem (CM) that is the sender to a cable modem terminal system (CMTS) 20 that is the receiver in the upstream direction, the PHS signaling processes are used in order to change the PHS rule by the CM 10. The packet whose EH_TYPE is set as 7 is transmitted to the CMTS 20.

When the CMTS 20 receives the packet whose EH_TYPE is set as 7, it is checked whether there exists an error in the packet and it is determined whether it is appropriate to change the new PHS rule. When the CMTS 20 can support the PHS rule requested by the CM 10, the success message is loaded on the packet whose EH_TYPE is set as 8 and the packet is transmitted to the CM 10. The CM continuously transmits the packet whose EH_TYPE is 7 to the CMTS 20 until the packet whose EH_TYPE is 8 is received.

When the response to the packet whose EH_TYPE is 7 is received from the CMTS 20, that is, the packet whose EH_TYPE is set as 8 is received, the CM terminates the common PHS signaling processes, sets the packet type as EH_TYPE 6, suppresses the packet into the new channel, and transmits the packet.

When the PHS rule to be changed cannot be supported, the CMTS 20 loads the failure message on the packet whose EH_TYPE is 8 and transmits the packet to the CM 10. At this time, the CM 10 determines that the PHS rule has failed, sets the packet type as the common MAC packet again, transmits the packet, and does not perform the suppression.

When the CM 10 does not receive the packet whose EH_TYPE is 8 from the CMTS 20 within previously designated predetermined time, that is, the response message is not received, the CM 10 sets the packet type as the common MAC packet again and transmits the packet to the CMTS 20.

When the CMTS 20 requests the CM 10 to change the PHS rule, as shown in FIG. 6, the CMTS 20 must load the PHS rule on the packet whose EH_TYPE is 7 and transmit the packet to the CM 10. The CM 10 transmits the processing result through the packet whose EH_TYPE is 8. The remaining processes are the same as the above-mentioned processes.

The PHS rule is changed using 3 DSC messages, that is, DSC-REQ, DSC-RSP, and DSC-ACK in the conventional art. However, according to the present invention, an appropriate EH_TYPE is set and the PHS rule to be changed is transmitted together with the user data without transmitting a MAC management message referred to as the DSC message.

As mentioned above, the MAC frame structure and the data communication method in the cable network according to the present invention has the following effects.

First, when the PHS rule is partially generated and the service flow is activated, it is possible to reduce time spent on performing the DSC signaling processes required for initializing the payload header suppression and unnecessary consumption of resources, to thus improve the efficiency of use of resources.

Second, since it is possible to transmit the user data transmitted without the suppression using the extended header type (EH_TYPE) together with the PHS rule to be newly applied, the cable network can save resources. Also, sine the DSC signal has messaging of 2 times meanwhile the DSC signal has messaging of three times in the conventional art, it is possible to reduce time spent on performing the PHS signaling processes.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A cable network, comprising:
   a cable modem (CM) for transmitting and receiving data;
   a media access control frame structure in the cable network to initialize payload header suppression of transmitted data packets through extended header types, the media access control frame comprising:
   a media access control header including various extended header types according to a service flow of data packets between a sender and a receiver over the cable network to be inserted in a payload data unit to initialize a payload header suppression rule; and
   a payload data unit comprising payload header suppression parameters other than those defined in the various extended header types according to a payload header suppression rule to permit initialization of payload header suppression using the defined PHS rule parameters in the various extended header types and the payload header suppression parameters in the payload data unit other than those defined in the various extended header types.

2. The cable network of claim 1, wherein the media access control header comprises:
   a frame controller for controlling a frame;
   a MAC_PARM part that is a media access control parameter and shows the number of minislots or asynchronous transfer mode cells;
   a LEN part for showing the length of the media access control frame;
   an EHDR part for showing the type, the length, the value, and the payload header suppression index of an extended header and changing the payload header suppression rule using 3 extended types; and
   a header check sequence for checking the media access control header.

3. The cable network of claim 1, wherein the media access control header comprises an EHDR part for showing the type, the length, the value, and the payload header suppression index of the extended header and changing the payload header suppression rule using the 3 extended types.

4. The cable network of claim 1, wherein the payload data unit comprises:
   a source address part for showing the address of the sender for transmitting suppressed payload header information;
   a destination address part for showing the address of the receiver, to which the suppressed payload header information is to be received;
   a type/length part for showing the type and the length of the suppressed payload header information;
   user data having information data and parameters according to the payload header suppression rule; and
   a cycling redundancy checking unit for checking the error of media access control frame data.

5. The cable network of claim 4, wherein the parameters according to the payload header suppression rule comprise a payload header suppression size, a payload header suppression field, a payload header suppression mask, and a payload header suppression verification.

6. A data communication method in a cable network, comprising the steps of:
   transmitting a first EH_TYPE data packet according to its payload header suppression rule to a receiver when the payload header suppression rule differs from the payload transmission rule of a preceding data transmission packet, in the case where communication is performed between a sender and the receiver;
   checking whether there exists an error in the first EH_TYPE data packet that has been transmitted to the receiver, determining whether to apply a new payload header suppression rule on the basis of the first EH_TYPE, and transmitting a second EH_TYPE data packet to the sender; and
   terminating transmission to the receiver of a common payload header suppression packet, setting a packet type as a third EH_TYPE, suppressing a packet into a new channel, and transmitting the packet when the second EH_TYPE packet is a success message and setting the packet type as a common media access control packet and transmitting the packet without performing suppression when the second EH_TYPE packet is a failure message.

7. The data communication method of claim 6, wherein the second EH_TYPE packet comprises a success or failure message.

8. The data communication method of claim 6, wherein the sender continuously transmits the first EH_TYPE to the receiver until the second EH_TYPE packet is received from the receiver.

9. The data communication method of claim 6, further comprising a step of the sender determining that the receiver cannot support a new payload header suppression rule.

10. A data communication method in a cable network, comprising the steps of:

transmitting a first EH_TYPE packet according to change in a payload header suppression rule to a receiver when the payload header suppression rule changes, in the case where communication is performed between a sender and the receiver;

checking whether there exists an error in the first EH_TYPE packet, determining whether to apply a new payload header suppression rule on the basis of the first EH_TYPE and transmitting a second EH_TYPE data packet to the sender; and terminating transmission to the receiver of a common payload header suppression packet, setting a packet type as a third EH_TYPE, suppressing a packet into a new channel, and transmitting the packet when the second EH_TYPE packet is a success message and setting the packet type as a common media access control packet and transmitting the packet without performing suppression when the second EH_TYPE packet is a failure message;

wherein the first EH_TYPE packet is set as a packet whose EH_TYPE is 7, the second EH_TYPE packet is set as a packet whose EH_TYPE is 8, and the third EH_TYPE packet is set as a packet whose EH_TYPE is 6 when the sender transmits the data to the receiver and wherein the first EH_TYPE packet is set as the packet whose EH_TYPE is 7, the second EH_TYPE packet is set as the packet whose EH_TYPE is 8, and the third EH_TYPE packet is set as the packet whose EH_TYPE is 5 when the receiver transmits the data to the sender.

11. A data communication method usable in a cable network comprising a cable modem (CM) for transmitting and receiving data, a media access control frame structure in the cable network to initialize payload header suppression of transmitted data packets through extended header types, the media access control frame comprising a media access control header including various extended header types according to a service flow of data packets between a sender and a receiver over the cable network to be inserted in a payload data unit to initialize a payload header suppression rule; and a payload data unit comprising payload header suppression parameters other than those defined in the various extended header types according to a payload header suppression rule to permit initialization of payload header suppression using the defined PHS rule parameters in the various extended header types and the payload header suppression parameters in the payload data unit other than those defined in the various extended header types, the method comprising the steps of:

transmitting a first EH_TYPE data packet according its payload header suppression rule to a receiver when the payload header suppression rule differs from the payload transmission rule of a preceding data transmission packet, in the case where communication is performed between a sender and the receiver; and checking whether there exists an error in the first EH_TYPE data packet that has been transmitted to the receiver, determining whether to apply a new payload header suppression rule, and transmitting a second EH_TYPE packet to the sender.

12. The data communication method of claim 11, wherein the sender continuously transmits the first EH_TYPE packet to the receiver until the second EH_TYPE packet is received from the receiver.

13. The data communication method of claim 11, further comprising a step of determining that the receiver cannot support the new payload header suppression rule when the second EH_TYPE packet is not received from the receiver for a predetermined time.

14. The data communication method of claim 11, further comprising a step of terminating the transmission of the common payload header suppression packet, setting the packet type as the third EH_TYPE suppressing the packet into the new channel, and transmitting the packet when the second EH_TYPE packet is the success message.

15. The data communication method of claim 11, further comprising a step of setting the packet type as the common media access control packet and transmitting the packet without performing the suppression when the second EH_TYPE packet is the failure message.

16. A data communication method in a cable network, comprising:

transmitting a first EH_TYPE packet according to change in a payload header suppression rule to a receiver when the payload header suppression rule changes, in the case where communication is performed between a sender and the receiver; and checking whether there exists an error in the first EH_TYPE packet, determining whether to apply a new payload header suppression rule, and transmitting a second EH_TYPE packet to the sender;

wherein the first EH_TYPE packet transmitted and received by the sender and the receiver is set as a packet whose EH_TYPE is 7, a second EH_TYPE packet is set as a packet whose EH_TYPE is 8, and a third EH_TYPE packet is set as a packet whose EH_TYPE is 6 when the sender transmits the data to the receiver and wherein the first EH_TYPE packet is set as the packet whose EH_TYPE is 7, a second EH_TYPE packet is set as a packet whose EH_TYPE is 8, and a third EH_TYPE packet is set as a packet whose EH_TYPE is 5 when the receiver transmits the data to the sender.

17. A method of using a media access control frame structure in a cable network comprising a cable modem (CM) for transmitting and receiving data, a media access control frame structure in the cable network to initialize payload header suppression of transmitted data packets through extended header types, the media access control frame comprising a media access control header including various extended header types according to a service flow of data packets between a sender and a receiver over the cable network to be inserted in a payload data unit to initialize a payload header suppression rule; and a payload data unit comprising payload header suppression parameters other than those defined in the various extended header types according to a payload header suppression rule to permit initialization of payload header suppression using the defined PHS rule parameters in the various extended header types and the payload header suppression parameters in the payload data unit other than those defined in the various extended header types to initialize payload header suppression of transmitted data packets through extended header types, the method comprising:

defining payload header suppression rule parameters in various extended header types in a media access control header according to a service flow of data packets between a sender and a receiver to be inserted in a payload data unit to initialize a payload header suppression rule; and inserting into a payload data unit payload header suppression parameters other than those defined in the various extended header types according to a payload header suppression rule to initialize payload header suppression using the defined PHS rule parameters in the various extended header types and the payload header suppression parameters in the payload data unit other than those defined in the various extended header types.

* * * * *